United States Patent
Carey et al.

(10) Patent No.: US 11,269,716 B2
(45) Date of Patent: Mar. 8, 2022

(54) SELF-HEALING OPERATIONS FOR ROOT CORRUPTION IN A FILE SYSTEM

(71) Applicant: MICROSOFT TECHNOLOGY LICENSING, LLC, Redmond, WA (US)

(72) Inventors: Omar Carey, Redmond, WA (US); Rajsekhar Das, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 140 days.

(21) Appl. No.: 16/411,129

(22) Filed: May 13, 2019

(65) Prior Publication Data
US 2020/0364105 A1   Nov. 19, 2020

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0727* (2013.01); *G06F 11/0751* (2013.01); *G06F 16/122* (2019.01); *G06F 16/1727* (2019.01)

(58) Field of Classification Search
CPC .... G06F 11/1446; G06F 11/079; G06F 11/36; G06F 11/366; G06F 11/0703; G06F 11/00; G06F 11/22; G06F 16/128; G06F 11/0793; G06F 11/0727; G06F 11/0751; G06F 11/004; G06F 16/122; G06F 16/1727
(Continued)

(56) References Cited

U.S. PATENT DOCUMENTS 5,875,444 A * 2/1999 Hughes ............... G06F 16/10
7,694,191 B1 * 4/2010 Bono .................. G06F 11/004
  714/48

(Continued)

OTHER PUBLICATIONS

Chang et al. "Bigtable: A Distributed Storage System for Structured Data", ACM Transactions on Computer Systems (TOCS) (Year: 2008).*

(Continued)

*Primary Examiner* — Sarai E Butler
(74) *Attorney, Agent, or Firm* — Shook, Hardy & Bacon L.L.P.

(57) ABSTRACT

Methods, systems, and computer storage media for providing self-healing operations for root corruptions in a file system are provided. While performing file system operations, the root may be inaccessible by the file system engine for executing file system operations. A root becomes inaccessible for performing file system operations when corrupted. A determination is made that the root having a root data region is corrupted and a self-healing operation should be performed. A root-corruption self-healing operation is executed to re-allocate (or recycle) the root data region to the root. The self-healing operation circumvents a copy-on-write policy of the file system to re-allocate the root data region of the root in-place and transform the root from a corrupted root to a recycled root. A file system data operation, such as a data recovery operation or file system management operation (e.g., a file or directory operation) can be performed using the recycled root.

20 Claims, 8 Drawing Sheets

(51) Int. Cl.
*G06F 16/11* (2019.01)
*G06F 16/17* (2019.01)

(58) Field of Classification Search
USPC .......................................................... 714/1–57
See application file for complete search history.

(56) References Cited

U.S. PATENT DOCUMENTS

| | | | | |
|---|---|---|---|---|
| 9,471,595 | B1* | 10/2016 | Vempati | .................. G06F 16/13 |
| 10,423,609 | B1* | 9/2019 | Strauss | ................ G06F 11/2094 |
| 2007/0198889 | A1 | 8/2007 | Moore et al. | |
| 2009/0089658 | A1* | 4/2009 | Chiu | ..................... G06F 40/205 |
| | | | | 715/234 |
| 2010/0088467 | A1* | 4/2010 | Lee | ..................... G06F 12/0246 |
| | | | | 711/104 |
| 2010/0106754 | A1* | 4/2010 | Condit | ................ G06F 12/0804 |
| | | | | 707/822 |
| 2013/0080480 | A1* | 3/2013 | Mao | ..................... G06F 16/182 |
| | | | | 707/803 |
| 2015/0169668 | A1 | 6/2015 | Preslan et al. | |
| 2016/0098413 | A1* | 4/2016 | Stephenson | ............. G06F 16/27 |
| | | | | 707/639 |
| 2018/0018218 | A1* | 1/2018 | Rat | ..................... G06F 11/1004 |

OTHER PUBLICATIONS

"International Search Report and Written Opinion Issued in PCT Application No. PCT/US2020/031938", dated Aug. 20, 2020, 13 Pages.

\* cited by examiner

SELF-HEALING OPERATIONS FOR ROOT CORRUPTION IN A FILE SYSTEM

BACKGROUND

Users rely on file systems for organizing data and files on computing systems. A file system, such as a resilient file system (ReFS), provides structure and logic rules to manage storage and retrieval, and, naming and grouping of data. For example, a file system, such as ReFS, can operate using a copy-on-write file technique (i.e., ReFS supports implicit sharing or shadowing, which is a technique used to make duplicates or copy a resource when modifying the resource). As the risk of data corruption continues to exist with file systems, data availability operations for a self-healing mechanism are important to improve the availability and durability of files in a file system.

SUMMARY

Various aspects of the technology described herein are generally directed to systems, methods, and computer storage media, for among other things, providing self-healing operations for root corruptions in file systems. In particular, a root data region of a corrupted root (i.e., a file system data reference object) is re-allocated to the root based on a self-healing operation. The self-healing operation for the root corruption is based on a logic that includes temporarily suspending and circumventing a copy-on-write technique of the file system. The self-healing operation re-allocates (or recycles) a corrupted root in-place (e.g., an in-place allocation) instead of executing a request for new space for the corrupted root.

By way of background, a file system (e.g., a resilient file system—ReFS) can provide the structure and logic rules used to manage storing and retrieving, and naming and grouping of data. A root can be a data reference object that supports managing tables associated with data in a file system. The root can be implemented with child node such that the root may support hierarchical storage and retrieval (e.g., directories and files) of data in a file system. When performing file system operations (e.g., saving a file), a computing error may cause data corruption. Data corruption can specifically include corruption of the root in the file system.

A conventional file system having a self-healing mechanism would implement a self-healing operation (e.g., in-line self-healing) on the data. Even though the conventional self-healing operation can work for child nodes of the root, the self-healing operation does not support self-healing for root nodes in the file system. As such, an alternative approach for providing a self-healing mechanism to support self-healing operations for root nodes in a file system would improve computing operations for more efficient storage usage and recovery from data corruption.

Aspects of the technical solution described in the present disclosure are directed towards improving self-healing operations for root corruptions in a file system. In particular, while performing file system operations, a root may be inaccessible by the file system engine for executing file system operations. For example, a loss of power or other computing errors while accessing a root may cause corruption of the root. A root becomes inaccessible for performing file system operations when corrupted. A determination is made that the root having a root data region is corrupted and a self-healing operation for the root corruption can be performed. Determining that a root is corrupted can be based on several different techniques (e.g., checksum blob or CRC—Cyclic Redundancy Check). Self-healing operations can be performed when location (e.g., location on disk volume) of the corrupted root is known.

The root data region is re-allocated to the root based on a self-healing operation. The self-healing operation re-allocates (or recycles) the root in-place to transform the root from a corrupted root to a recycled root. Recycling the root, contemplates temporarily suspending and circumventing a copy-on-write policy of the file system for the self-healing operation. For example, the root cannot be duplicated and allocated to a new location on the volume because it is corrupted, as such, the root is un-allocable. Suspending the copy-on-write policy removes the copying portion of the operation and the location on disk is recycled in-place or allocated in-place when the root corruption occurs. More generally, recycle-in place operations (or allocate in-place operations) may be performed as part of a self-healing operation for any data reference object that conventionally operates using a copy-on-write policy, where the data reference object is un-allocable when corrupted. A file system data operation, such as a data recovery operation or file system management operation (e.g., a file or directory operation) can be performed using the recycled root. Additional aspects of the technical solution are described below, by way of exemplary implementations, with reference to technical environments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION

Figure 1:
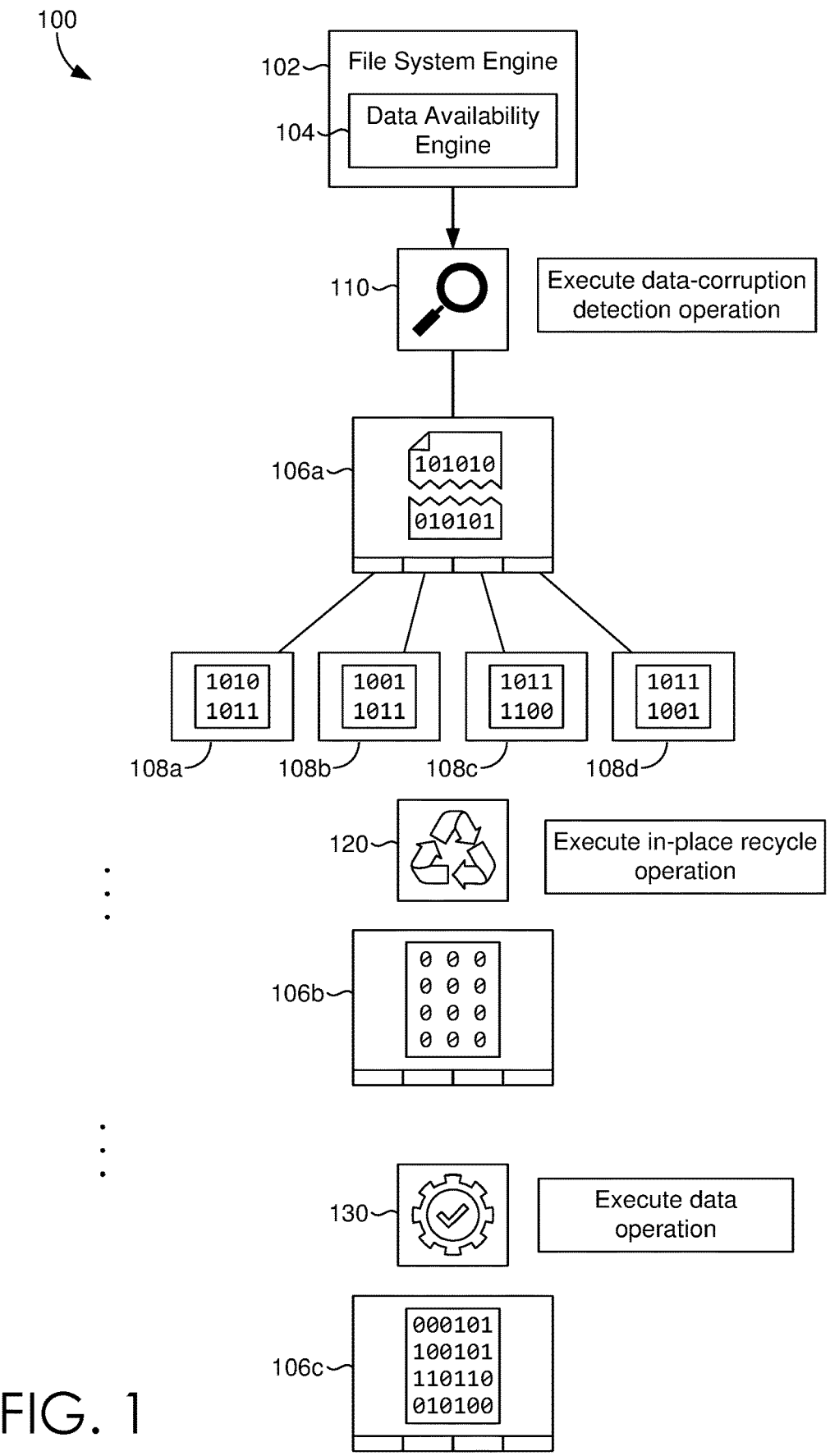
FIG. 1 is a block diagram of an exemplary environment for providing self-healing operations for root corruptions in a file system, suitable for use in implementing aspects of the technology described herein.

Overview of Aspects of the Technological Improvement

A file system, such as a resilient file system (ReFS), provides structure and logic rules to manage storage and retrieval, and naming and grouping of data. The file system operates to maximize data availability, scale efficiently to large data sets across diverse workloads, and provide data integrity by means of resiliency to corruption. A files system, such as ReFS, can operate using a copy-on-write file technique (i.e., ReFS supports implicit sharing or shadowing, which is a technique used to make duplicates or copy a resource when modifying the resource). If a resource is duplicated but not modified, it is not necessary to create a new resource; the resource can be shared between the copy and the original. Modifications must still create a copy, hence the technique: the copy operation is deferred to the first write. As the risk of data corruption continues to exist with file systems, data availability operations for a self-healing mechanism are important to improve the availability and durability of files in a file system. By sharing resources in this way, it is possible to significantly reduce the resource consumption of unmodified copies, while adding a small overhead to resource-modifying operations.

By way of background, a file system engine can include an availability engine that operates to maintain availability of data storage volumes of a file system. The availability engine supports corruption detection, corruption repair, salvage operations, and rebuild operations. At a high level, the file system engine manages B+ trees having object tables. An object table may have objects that are stored in blocks on disk, where the blocks on disk are associated with pointers from the object tables. Object tables include rows having pointers to the roots of trees. The pointers can be repaired with checksum blobs that can be used to validate the data. When performing file system operations (e.g., saving a file), a computing error may cause data corruption. Data corruption can specifically include corruption of the root in the file system.

The file system can also provide corruption detection for data (e.g., metadata) associated with files stored in the file system and execute an appropriate action to repair the corruption or restore the file from backup. For example, the file system can detect when a metadata page is corrupted using a checksum feature of the file system, and then take a recovery action in-line. Corruptions can occur on metadata (e.g., metadata page) associated with a file. Metadata can be user metadata or file system metadata. Repairs can be based on having additional information about the particular corrupted data. For example, one recovery operation includes logging an event and deleting the file to leave the file in a consistent state. However, before deleting the file, if the volume is resilient (i.e., has a backup the volume data) a check (for example, in-line with a read) can be performed on a copy of the file to determine whether the backup copy is not corrupted. If a non-corrupted copy exists it can be used to repair the corrupted file.

Another type of corruption that can occur in a file system is corruption of file system metadata (e.g., global "critical" metadata). Conventional file systems implementing a self-healing mechanism would implement self-healing operations (e.g., in-line self-healing) for metadata having known content and location on disk. For example, a corruption of an allocator is a corruption of the file system data for which the content is known and the location, as the allocator is managed by the file system. Unlike a user file or user metadata, the allocator storage content and location (e.g., on disk) is known (e.g., what the table represents). For example, for an allocator, the range or cluster of the volume that corresponds to the allocator can be determined as a known location on the volume for the root. As a file system can be based on the normal operations and features of the file system, such as copy-on-write technique, recovering from an allocation inherently involves executing an allocation operation based on the existing feature—i.e., a copy-on-write technique. A recovery operation in this scenario can be to mark all range regions as allocated.

With that as context, if a B+ table has a root and two child nodes, the current self-healing mechanism is able to detect and fix corruptions in any node of the B+ table except for the root. The root (having a root data region) is a unique feature of the file system because the root is referenced by other aspects of the file system. Conventionally, when the root is corrupted, the volume would simply be considered a failed volume when the system is unable to read from a root which could not be fixed. As such, even though the current self-healing operations work for child nodes, the current self-healing mechanism does not support self-healing for root nodes in the file system. As the risk of data corruption continues to exist with file systems, data availability operations for a self-healing mechanism are important to improve the availability and durability of files in a file system.

Embodiments of the present invention are directed to simple and efficient methods, systems, and computer storage media for providing self-healing operations for root corruption in a file system. At a high level, a root can be implemented in a file system to support managing tables used for hierarchical storage and retrieval of data (e.g., directories and files) in a file system. The root may specifically have a root data region allocated to the root to support file system operations. When performing file system operations (e.g., saving a file), a computing error may cause data corruption. Data corruption can specifically include corruption of a root of a B+ tree in the file system. When corrupted, a root becomes inaccessible for performing file system operations. A determination is made that the root is corrupted and a self-healing operation should be performed. A self-healing operation is executed for the root. The self-healing operation re-allocates the root data region (or recycles) in-place to transform the root from a corrupted root to a recycled root. Recycling the root during the self-healing operation contemplates circumventing or temporarily suspending a copy-on-write policy of the file system. A file system data operation, such as a data recovery operation or file system management operation (e.g., a file or directory operation) can be performed using the recycled root.

Aspects of the technical solution can be described by way of examples and with reference to FIG. 1. FIG. 1 includes a file system engine 102 and data availability engine 104. The file system engine 102 typically manages operations, such as storage management, file naming, directories or folders, metadata, access rules and privileges. Commonly used file systems include File Allocation Table 32 (FAT 32), New Technology File System (NTFS) and Hierarchical File System (HFS). The data availability engine operates to maintain a condition in which the data is available at any required level of performance, ranging from normal to failure level. In other words, data availability indicates the accessibility of data.

At block 110, data corruption can be detected using the data availability engine 104. Generally, data corruption can refer to errors in computer data that occur during writing, reading, storage, transmission, or processing, which introduce unintended changes to the original data. Computer, transmission, and storage systems use a number of measures to provide end-to-end data integrity, or lack of errors. Data corruption detection can include determining that a root (e.g., starting point for accessing data stored in a file system)

is not accessible. The corrupted root is inaccessible for executing file system operations.

Additional information about the root can then be determined. For example, root 106*a* is associated with child nodes 108*a*, 108*b*, 108*c*, and 108*d*. The root can be associated with a root data region that support performing file system operations. It is determined that the root 106*a* is corrupted. The root can be associated with a table, where the table is a global table associated with a global allocator of the file system. The global allocator manages file system metadata in a known volume location of the file system metadata. The global allocator is discussed for example purposes; however, it is contemplated that any similar situated allocator may be appropriate for embodiments of the technical solution described herein. The root of an allocator may also not be autonomously allocable in that the copy-on-write policy is active in a copy-on-write file system. In other words, the copy-on-write policy restricts the capacity for the allocator to autonomously allocate a new root to the allocator itself. As such, aspects of this technical solution contemplate identifying a root (or a file management object, a data reference object) that cannot be autonomously allocated, and then, for the root, temporarily suspending the copy-on-write policy when executing self-healing operations.

At block 120, a self-healing operation can be executed on root 106*a* to generate root 106*b*. The self-healing operation is a root-corruption self-healing operation that is performed in-place to recycle the corrupted root 106*a* to a recycled root 106*b*. Executing the self-healing operation can include suspending the copy-on-write policy of the file system. Such a policy is implemented for normal operations but it is bypassed during the self-healing operation so the root can be recycled in-place. For example, the root cannot be duplicated and allocated to a new location on the volume because it is corrupted, as such, the root is un-allocable. Suspending the copy-on-write policy removes the copying portion of the operation and the location on disk is recycled in-place or allocated in-place when the root corruption occurs. More generally, recycle-in place operations (or re-allocate in-place operations) may be performed as part of a self-healing operation for any data reference object that conventionally operates using a copy-on-write policy, where the data reference object is un-allocable when corrupted. A file system data operation, such as a data recovery operation or file system management operation (e.g., a file or directory operation) can be performed using the recycled root.

Executing the self-healing operations further include reinitializing a table on the recycled root. Reinitializing the table can include a reset that clears any pending errors or events and brings a system to normal condition or an initial state, in a controlled manner. Executing the self-healing operations can further include executing a zero-out operation on the location on volume. Zeroing-out the root can mark the location on the volume as fully allocated. For example, a fully allocated volume contains both virtual capacity and real capacity, which are set when you create the volume. Fully allocated volumes are created with the same amount of real capacity and virtual capacity. Virtual capacity is the volume storage capacity that is available to a host. The file system engine 102 can now have the table come online. Further the data availability engine 104 can perform data operations. For example, the data availability engine 104 can further execute data operations using the recycled root.

At block 130, a data operation is executed based on the root 106*c*. Executing a data operation using the recycled root may include executing a data recovery operation. Data recovery operations may generally refer to operations for restoring data that has been lost, accidentally deleted, corrupted or made inaccessible. A data recovery operation may specifically identify allocated locations that do not have references and repair the allocated location. Executing a data operation using the data operation can also include a read operation or write operation that is executed on the root data region (e.g., repaired known location of the volume). For example, the repaired volume location after the in-place allocation can have a reinitialized table and support storing and retrieving data (e.g., file system metadata).

Aspects of the technical solution of this disclosure have been described with reference to several inventive features and advantages associated with a file system 102 having data availability engine that improves on self-healing operations for root corruptions in file systems. In particular, based on selectively suspending a copy-on-write policy of a file system when a data reference object (e.g., root) is not autonomously allocable, such that the copy-on-write policy is circumvented, demonstrates that the operations for self-healing are an unconventional ordered combination of operations that operate as a solution to a specific problem in file system technology environment to improve computing operations in file systems. Overall, the a practical application of aspects of the technical solution described results in improvements based on less CPU computation, smaller memory requirements, and increased flexibility in file systems.

Figure 2:
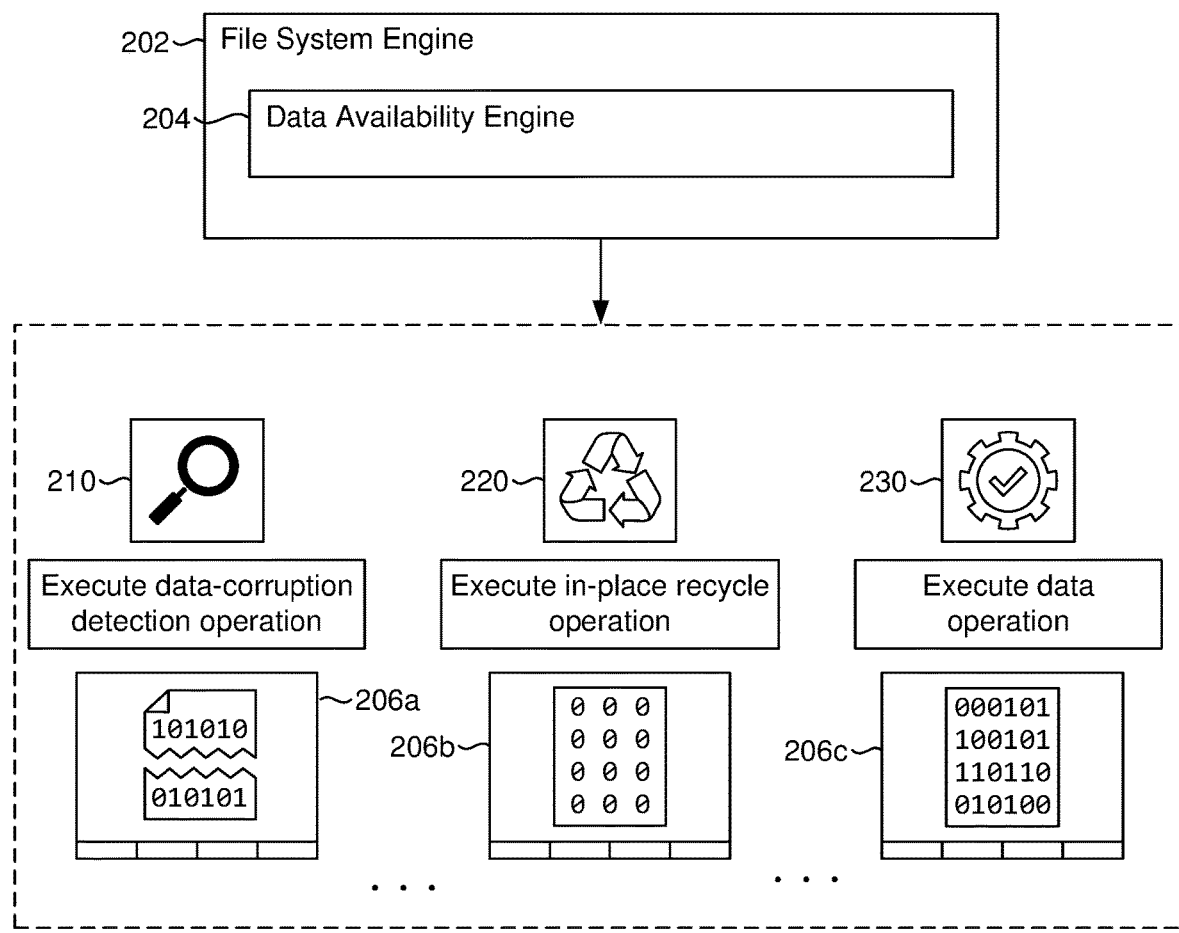
FIG. 2 is an exemplary file system engine in accordance with aspects of the technology described herein.

Overview of Example Environments for Providing Self-Healing Operations for Root Corruptions in File Systems Turning to FIG. 2, a block diagram of an exemplary technical solution environment (file system environment 200) suitable for use in implementing embodiments of the technical solution are shown. Generally the technical solution environment includes a technical solution system suitable for providing self-healing operations for root corruptions in file systems. The file system environment 200 includes a file system engine 202 having a data availability engine 204 and root 206*a* is recycled to 206*b*.

The data availability engine 204 is responsible for determining that a root having a root data region is corrupted. The root can be starting point for accessing data stored in a file system. The root may be un-allocable when the copy-on-write policy is active in the file system. The data availability engine 204 can specifically determine that the root is corrupted based on determining a known volume location (root data region) of the root is corrupted. The known volume can be associated with file system metadata that is managed using a table. The table can be a global table associated with a global allocator of the file system; however other types of allocators can be used for implementing aspects of the technical solution described herein.

The data availability engine 204 executes a self-healing operation for root corruption. The self-healing operation recycles the root. In particular, the root is recycled in-place from a corrupted root to a recycled root. The root-corruption self-healing operation circumvents (e.g., bypasses, overrides) a copy-on-write policy of the file system. In other words, the data availability engine 204 re-allocates the root data region to the root based on a self-healing operation, where the self-healing operation circumvents a copy-on-write policy of the file system to re-allocate the root data region of the root in-place and transform the root from a corrupted root to a recycled root. Executing the root-corruption self-healing operation can include on or more of reinitializing a table on the recycled root or executing a zero-out operation for a known volume location corresponding to the root. Zeroing-out the root marks the location on the volume as fully allocated. The data availability engine 240 further executes a data operation using the recycled root. A data operation can include a data recovery operation that identifies allocated locations that do not have references and repairs the allocated location. The data operation may also a read operation or write operation that is executed on a repaired known location of the volume.

Figure 3:
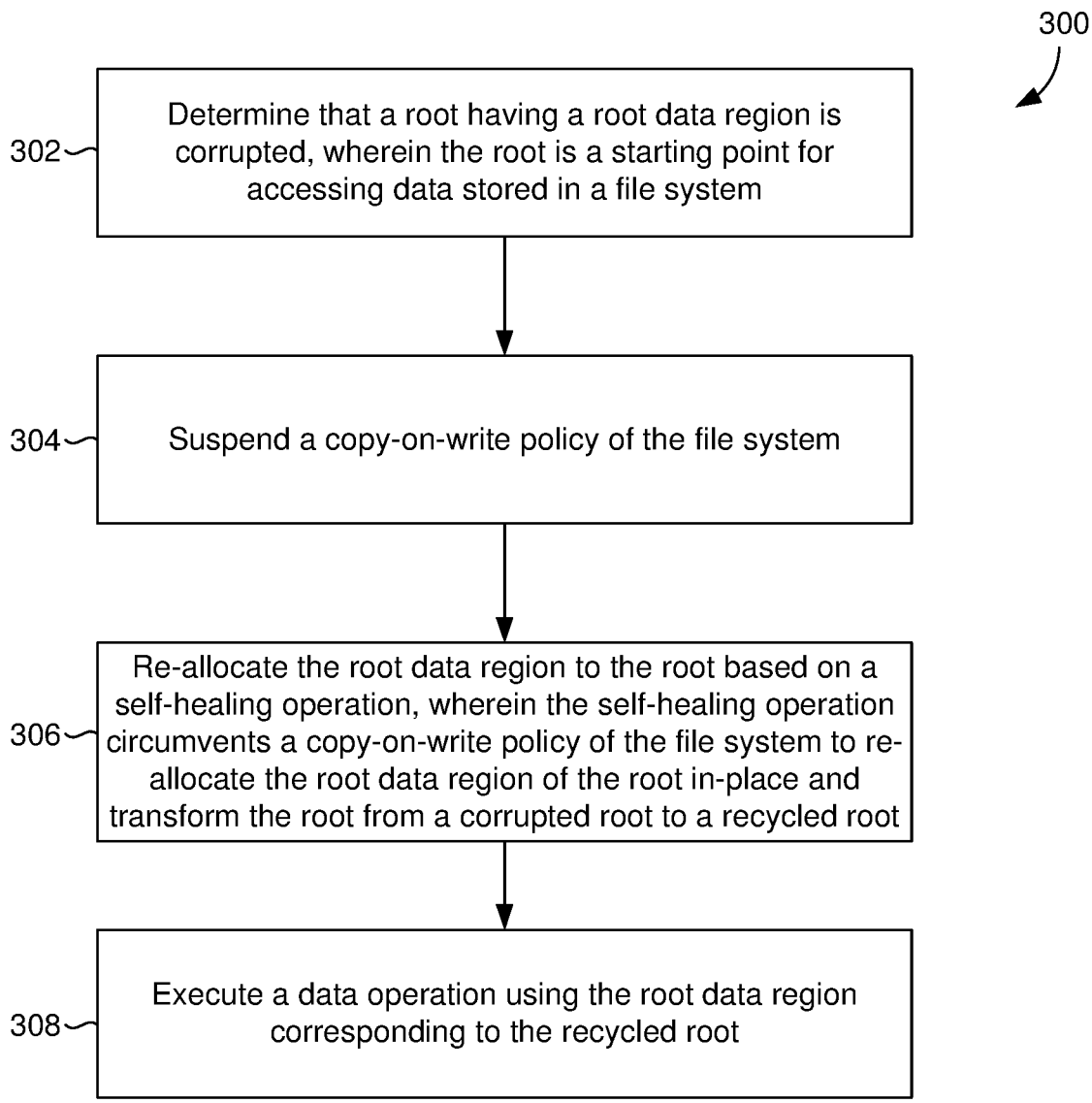
FIG. 3 provides a first exemplary method of providing self-healing operations for root corruptions in a file system in accordance with aspects of the technology described herein.
Figure 4:
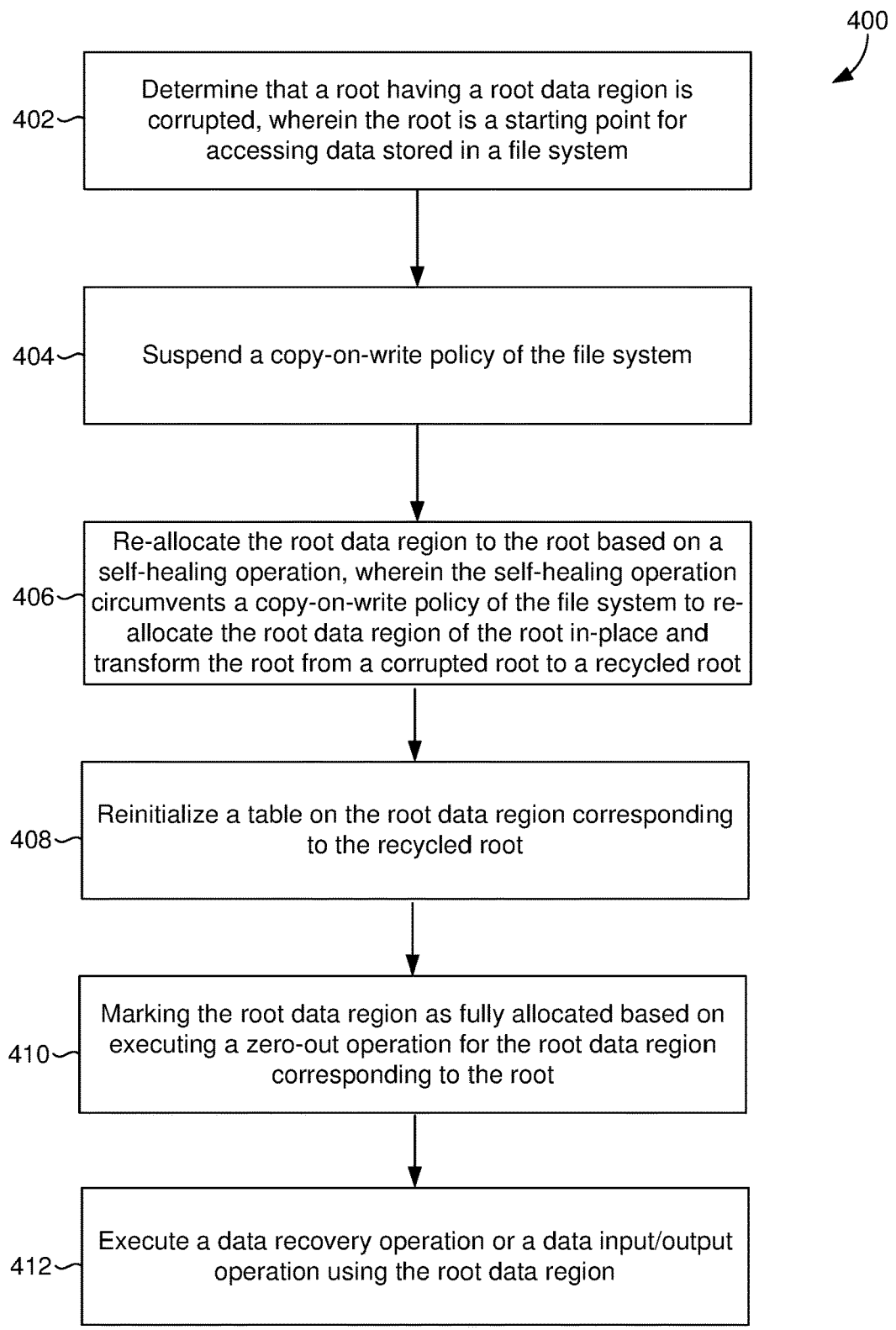
FIG. 4 provides a second exemplary method of providing self-healing operations for root corruptions in a file system, in accordance with aspects of the technology described herein.
Figure 5:
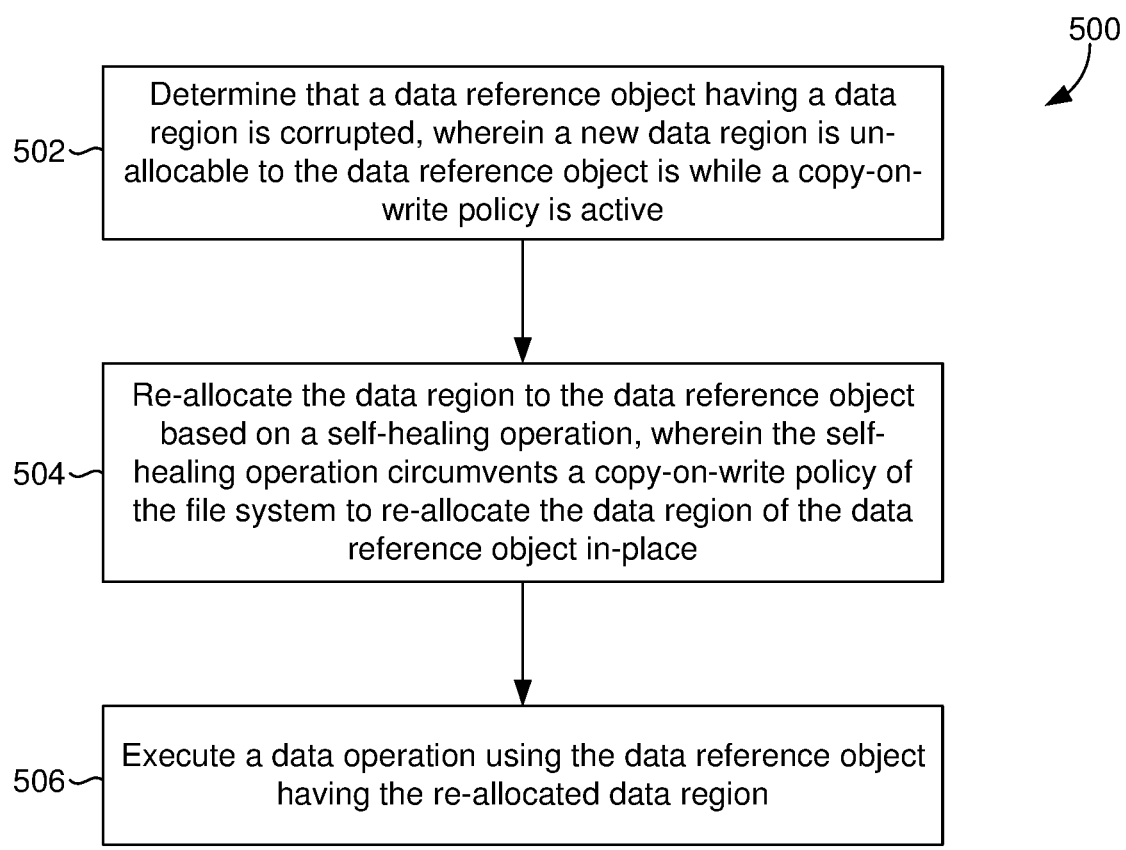
FIG. 5 provides a third exemplary method of providing self-healing operations for root corruptions in a file system, in accordance with aspects of the technology described herein.

Exemplary Methods for Providing Self-Healing Operations for Files in a File System With reference to FIGS. 3, 4 and 5, flow diagrams are provided illustrating methods for self-healing operations for root corruptions in a file system. The methods may be performed using the search system described herein. In embodiments, one or more computer storage media having computer-executable instructions embodied thereon that, when executed, by one or more processors can cause the one or more processors to perform the methods in the file system.

Turning to FIG. 3, a flow diagram is provided that illustrates a method 300 for providing seal-healing operations for root corruption in a file system. Initially at block 302, a determination is made that root having a root data region is corrupted. The root is a starting point for accessing data stored in a file system. At block 304, a copy-on-write policy of a file system is suspended. The copy-on-write policy is feature of the file system that is triggered when allocating block disk storage to table objects. At block 306, the root data region is re-allocated to the root based on a self-healing operation. The self-healing operation circumvents a copy-on-write policy of the file system to re-allocate the root data region of the root in-place and transform the root from a corrupted root to a recycled root. At block 308, a data operation is executed using the root data region corresponding to the recycled root.

Turning to FIG. 4, a flow diagram is provided that illustrates a method 400 for providing seal-healing operations for root corruption in a file system. Initially at block 402, a determination is made that root having a root data region is corrupted. The root is a starting point for accessing data stored in a file system. At block 404, a copy-on-write policy of a file system is suspended. The copy-on-write policy is feature of the file system that is triggered when allocating block disk storage to table objects. At block 406, the root data region is re-allocated to the root based on a self-healing operation. The self-healing operation circumvents a copy-on-write policy of the file system to re-allocate the root data region of the root in-place and transform the root from a corrupted root to a recycled root. At block 408, a table is reinitialized on the recycled root. At block 410, the root data region is marked as fully allocated based on executing a zero-out operation for the root data region corresponding to the root. At 412, a data recovery operation or a data input/output operation is executed using the recycled volume.

Turning to FIG. 5, a flow diagram is provided that illustrates a method 500 providing seal-healing operations for root corruption in a file system. Initially at block 502, a determination is made that a data reference object having a data region is corrupted. A new data region is un-allocable to the data reference object while a copy-on-write policy is active. At block 504, the data region is re-allocated to the data reference object based on a self-healing operation. The self-healing operation circumvents the copy-on-write policy of the file system to re-allocate the data region of the data reference object in-place and transform the data reference object from a corrupted data reference object to a recycled data reference object. At block 506, a data operation is executed using the recycled root.

Example File System Environment

With reference to the file system environment 600 that includes a file system (e.g., Resilient File System—ReFS), embodiments described herein support the functionality of the technical solution described above. The file system environment 600 includes distributed components of the file system that are communicatively implemented in combination with other integrated components that implement aspects of the technical solution. The file system environment 600 refers to the hardware architecture and software framework that support the functionality of the technical solution.

At a high level, the file system provides configuration rules (e.g., logic and data structures) used to manage storage and retrieval, and naming and grouping of data. In particular, the configuration rules are based on a copy-on-write (i.e., write-to-new) design. In this regard, the file system is a copy-on-write file system. In particular, an application programming interface operates with a storage engine to provide a write-to-new B+ key-value file system. The file system can support data integrity, file-level snapshots ("block cloning"), data tiering and dynamic layout on disks, among other functionality.

Figure 6:
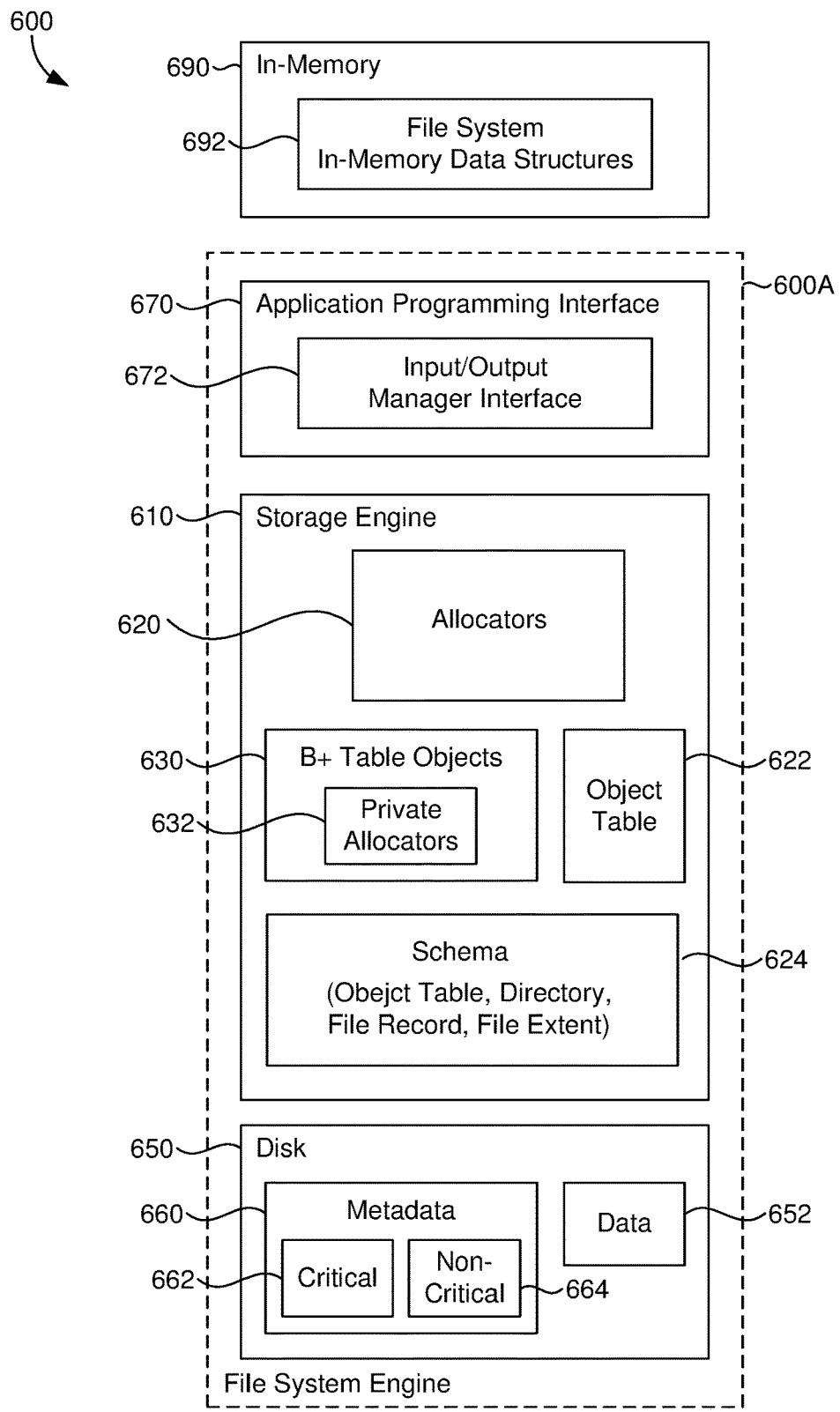
FIG. 6 provides a block diagram of an exemplary file system environment suitable for use in implementing aspects of the technology described herein.

FIG. 6 shows a high level architecture file system environment 600 having components in accordance with implementations of the present disclosure. It should be understood the arrangement described herein is set forth only as examples and other arrangements, instead of those shown, are contemplated. Among other components not shown, the file system environment 600 includes file system engine 600A having storage engine 610, disk 650, application programming interface 670, and in-memory 690. The storage engine 610 includes allocators 620, object table 622, and schema 624, B+ table objects 630 (with private allocators 632), and disk 650 includes files 652, and metadata 660 (with critical (metadata) 662, non-critical (metadata) 664); API 670 includes input/output manager interface 672; and in-memory 690 having file system in-memory data structures 692.

The storage engine 610 provides allocators (e.g., global allocators and private allocator) that allocate storage of table objects. In particular, the storage engine 610 provides B+ table objects 630 with internal private allocators 632, and an object table 622 to track the B+ table objects. The storage engine 610 supports storing roots of one B+ table within another B+ table and supports stream extents. Storing roots of B+ tables within another can leave the embedded table unable to have an entry in the object table. Directories are B+ table objects referenced by the object table 622. Files are B+ tables whose roots are embedded in the row of directories. Streams are implemented as a table of file extents whose roots are embedded in the file record.

In operation, the file system creates and manipulates B+ table objects in order to store file system metadata (e.g., critical and non-critical metadata) and uses the stream extent functionality for user stream data. In particular, the file system implements two types of metadata (i.e., global "critical" metadata 662 and non-critical metadata 664). Critical metadata 662 is managed independently of non-critical metadata 664. For example, writing critical metadata 662 is based on a different logic from the non-critical metadata 664 based on the separation from the critical metadata. Writing metadata may be implemented based on a locking mechanism.

The storage engine 610 supports a schema 624 for organizing information (e.g., B+ tables of files and directories) in the file system. For example, when a B+ table is created, the table object is assigned an ID in the object table. Every entry is a <key, value> pair in the form <object_id, root_location> where object_id is the volume-unique identifier of the object and root location is the block address of the root bucket of the table. Because all directories are durable table objects in file system, the vast majority of entries in the object table refer to directories.

Directories are B+ table objects that are responsible for a single, flat namespace. Directories logically contain files, links to files in other directories, and links to other directories. It is through directories and links to directories that the traditional hierarchical file system namespace is built. Rows in a directory table are logically of the form <key, <type, value>> where key is unique in the table, type indicates the way in which value should be interpreted, and value is then type-specific. Directories, being tables, are composed of rows.

Files 652 are stored in association with directories. For example, files 652 may have file records that are B+ tables rooted in a directory B+ table. Files in directories can appear as <key, value> pairs of the form <file_name, file_record>. In one implementation, file_name can be a Unicode string and file_record is an embedded B+ table. Embedded B+ tables in storage engine may embed only their roots in the value of another table. In this regard, a file_record is constructively the root of a table.

In-memory data structures of the file system support in-memory operations and other associated operations of the file system. At a high level, in-memory processing can be based on file objects, file control blocks (FCB) and stream control blocks (SCB). In particular, a file object points to the SCB data structure which represents a single data entity contained in a single file. The file that contains the data entity is represented by a file control block. Durable changes for the SCB and the FCB are supported using a B+ table. Every open file in file system can be implemented with a single FCB as its in-memory anchor. An open file with a single data stream also has an SCB representing that stream. The FCB, being responsible for the on-disk file record, points to the open storage engine B+ table object that represents the file. In this regard, files are B+ tables, while file attributes are rows in the B+ table.

The file system API 670 is an application programming interface through which services of the file system can be requested. For example, the input/output manger interface 672 can support read operations, write operations, metadata management operations, and maintenance operations (e.g., creating or initializing a file system, verifying the file system for integrity, and defragmentation). An operating system of a device using the file system can provide the API to support the file system operations. It is contemplated by various features of the technical solution of the present invention can be performed using file system environment 600 and other variations and combinations thereof.

Example Distributed Computing Environment

Figure 7:
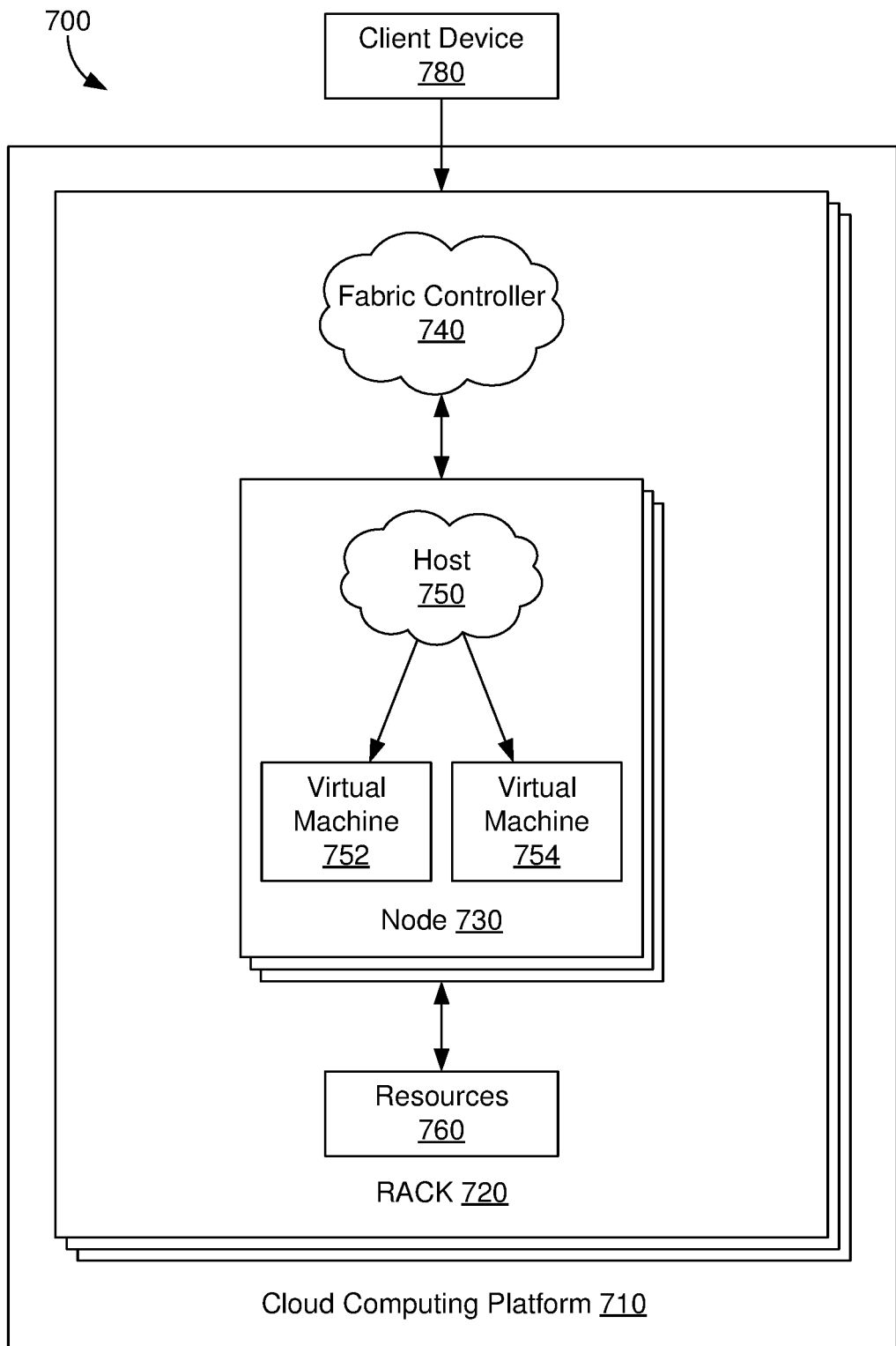
FIG. 7 provides a block diagram of an exemplary distributed computing environment suitable for use in implementing aspects of the technology described herein.

Referring now to FIG. 7, FIG. 7 illustrates an example distributed computing environment 700 in which implementations of the present disclosure may be employed. In particular, FIG. 7 shows a high level architecture of an example cloud computing platform 710 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 700 that includes cloud computing platform 710, rack 720, and node 730 (e.g., computing devices, processing units, or blades) in rack 720. The technical solution environment can be implemented with cloud computing platform 710 that runs cloud services across different data centers and geographic regions. Cloud computing platform 710 can implement fabric controller 740 component for provisioning and managing resource allocation, deployment, upgrade, and management of cloud services. Typically, cloud computing platform 710 acts to store data or run service applications in a distributed manner. Cloud computing infrastructure 710 in a data center can be configured to host and support operation of endpoints of a particular service application. Cloud computing infrastructure 710 may be a public cloud, a private cloud, or a dedicated cloud.

Node 730 can be provisioned with host 750 (e.g., operating system or runtime environment) running a defined software stack on node 730. Node 730 can also be configured to perform specialized functionality (e.g., compute nodes or storage nodes) within cloud computing platform 710. Node 730 is allocated to run one or more portions of a service application of a tenant. A tenant can refer to a customer utilizing resources of cloud computing platform 710. Service application components of cloud computing platform 710 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 730, nodes 730 may be partitioned into virtual machines (e.g., virtual machine 752 and virtual machine 754). Physical machines can also concurrently run separate service applications. The virtual machines or physical machines can be configured as individualized computing environments that are supported by resources 760 (e.g., hardware resources and software resources) in cloud computing platform 710. It is contemplated that resources can be configured for specific service applications. Further, each service application may be divided into functional portions such that each functional portion is able to run on a separate virtual machine. In cloud computing platform 710, multiple servers may be used to run service applications and perform data storage operations in a cluster. In particular, the servers may perform data operations independently but exposed as a single device referred to as a cluster. Each server in the cluster can be implemented as a node.

Client device 780 may be linked to a service application in cloud computing platform 710. Client device 780 may be any type of computing device, which may correspond to computing device 700 described with reference to FIG. 7, for example, client device 780 can be configured to issue commands to cloud computing platform 710. In embodiments, client device 780 may communicate with service applications through a virtual Internet Protocol (IP) and load balancer or other means that direct communication requests to designated endpoints in cloud computing platform 710. The components of cloud computing platform 710 may communicate with each other over a network (not shown), which may include, without limitation, one or more local area networks (LANs) and/or wide area networks (WANs).

Example Operating Environment

Figure 8:
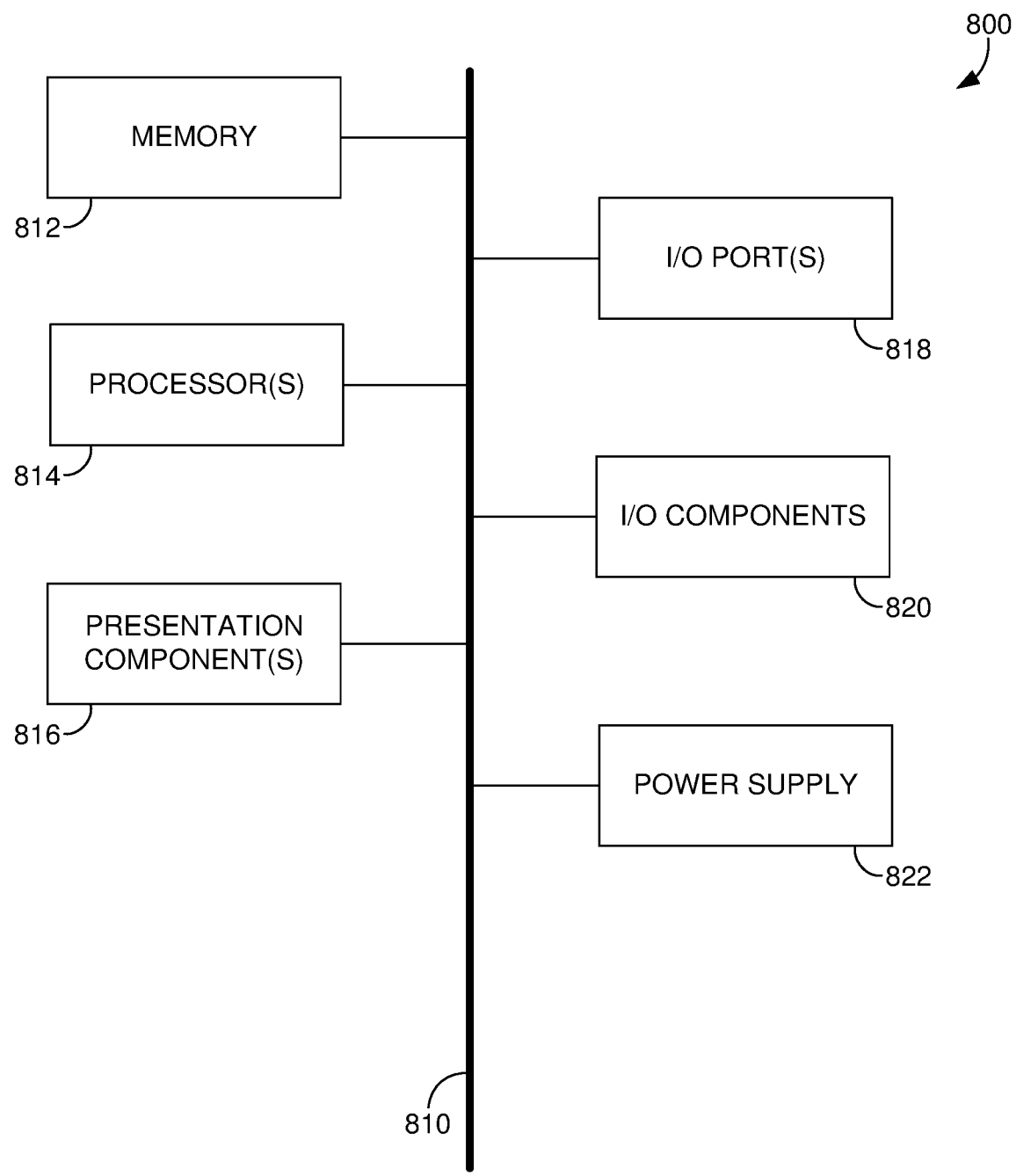
FIG. 8 is a block diagram of an exemplary computing environment suitable for use in implementing aspects of the technology described herein.

Having briefly described an overview of embodiments of the present invention, an example operating environment in which embodiments of the present invention may be implemented is described below in order to provide a general context for various aspects of the present invention. Referring initially to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more buses (such as an address bus, data bus, or combination thereof). The various blocks of FIG. 8 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 8 is merely illustrative of an example computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A system having a file system engine for providing self-healing operations in file systems, the system comprising: one or more hardware processors; and one or more computer storage media storing computer-useable instructions that, when used by the one or more hardware processors, cause the one or more processors to execute: determining that a root having a root data region is corrupted, wherein the root is a starting point for accessing data stored in a the system; re-allocating the root data region to the root based on a self-healing operation, wherein the self-healing operation circumvents a copy-on-write policy of the file system to re-allocate the root data region of the root in-place and transform the root from a corrupted root to a recycled root; and executing a data operation using the root data region corresponding to the recycled root.

2. The system of claim 1, wherein the root is un-allocable when the copy-on-write policy is active in the file system.

3. The system of claim 1, wherein determining that the root is corrupted further comprises determining that a known volume location of the root corresponding to the root data region is corrupted.

4. The system of claim 3, wherein the corrupted root is inaccessible for executing file system operations for a table associated with the root, wherein the table is a global table associated with a global allocator of the file system, the global allocator manages file system metadata in the known volume location of the file system metadata.

5. The system of claim 1, wherein executing the self-healing operation further comprises suspending the copy-on-write policy of the file system.

6. The system of claim 1, wherein executing the self-healing operation further comprises:
reinitializing a table on the root data region corresponding to the recycled root; and
marking the root data region as fully allocated based on executing a zero-out operation for the root data region corresponding to the root.

7. The system of claim 1, wherein executing the data operation using the root data region corresponding to the recycled root further comprises:
executing the data operation as a data recovery operation that identifies allocated locations that do not have references and repairs the allocated locations; or
executing the data operation as a read operation or a write operation based on the root data region.

8. One or more computer storage media having computer-executable instructions embodied thereon that, when executed, by one or more processors, cause the one or more processors for providing self-healing operations in file systems, the self-healing operations comprising:

determining that a root having a root data region is corrupted, wherein the root is a starting point for accessing data stored in a file system;

re-allocating the root data region to the root based on a self-healing operation, wherein the self-healing operation circumvents a copy-on-write policy of the file system to re-allocate the root data region of the root in-place and transform the root from a corrupted root to a recycled root; and executing a data operation using the root data region corresponding to the recycled root.

9. The media of claim 8, wherein the root is un-allocable when the copy-on-write policy is active in the file system.

10. The media of claim 8, wherein determining that the root is corrupted further comprises determining that a known volume location of the root corresponding to the root data region is corrupted.

11. The media of claim 10, wherein the corrupted root is inaccessible for executing file system operations for a table associated with the root, wherein the table is a global table associated with a global allocator of the file system, the global allocator manages file system metadata in the known volume location of the file system metadata.

12. The media of claim 8, wherein executing the self-healing operation further comprises suspending the copy-on-write policy of the file system.

13. The media of claim 8, wherein executing the self-healing operation further comprises:

reinitializing a table on the root data region corresponding to the recycled root; and marking the root data region as fully allocated based on executing a zero-out operation for the root data region corresponding to the root.

14. The media of claim 8, wherein executing the data operation using the root data region corresponding to the recycled root further comprises:

executing the data operation as a data recovery operation that identifies allocated locations that do not have references and repairs the allocated locations; or executing the data operation as a read operation or a write operation based on the root data region.

15. A computer-implemented method for providing self-healing operations in file systems, the method comprising:

determining that a root having a root data region is corrupted, wherein the root is a starting point for accessing data stored in a file system;

re-allocating the root data region to the root based on a self-healing operation, wherein the self-healing operation circumvents a copy-on-write policy of the file system to re-allocate the root data region of the root in-place and transform the root from a corrupted root to a recycled root; and executing a data operation using the root data region corresponding to the recycled root.

16. The method of claim 15, wherein the root is un-allocable when the copy-on-write policy is active in the file system.

17. The method of claim 15, wherein determining that the root is corrupted further comprises determining that a known volume location of the root corresponding to the root data region is corrupted.

18. The method of claim 17, wherein the corrupted root is inaccessible for executing file system operations for a table associated with the root, wherein the table is a global table associated with a global allocator of the file system, the global allocator manages file system metadata in the known volume location of the file system metadata.

19. The method of claim 15, wherein executing the self-healing operation further comprises suspending the copy-on-write policy of the file system.

20. The method of claim 15, wherein executing the self-healing operation further comprises:

reinitializing a table on the root data region corresponding to the recycled root; and marking the root data region as fully allocated based on executing a zero-out operation for the root data region corresponding to the root.

* * * * *